United States Patent Office 3,468,221
Patented Sept. 23, 1969

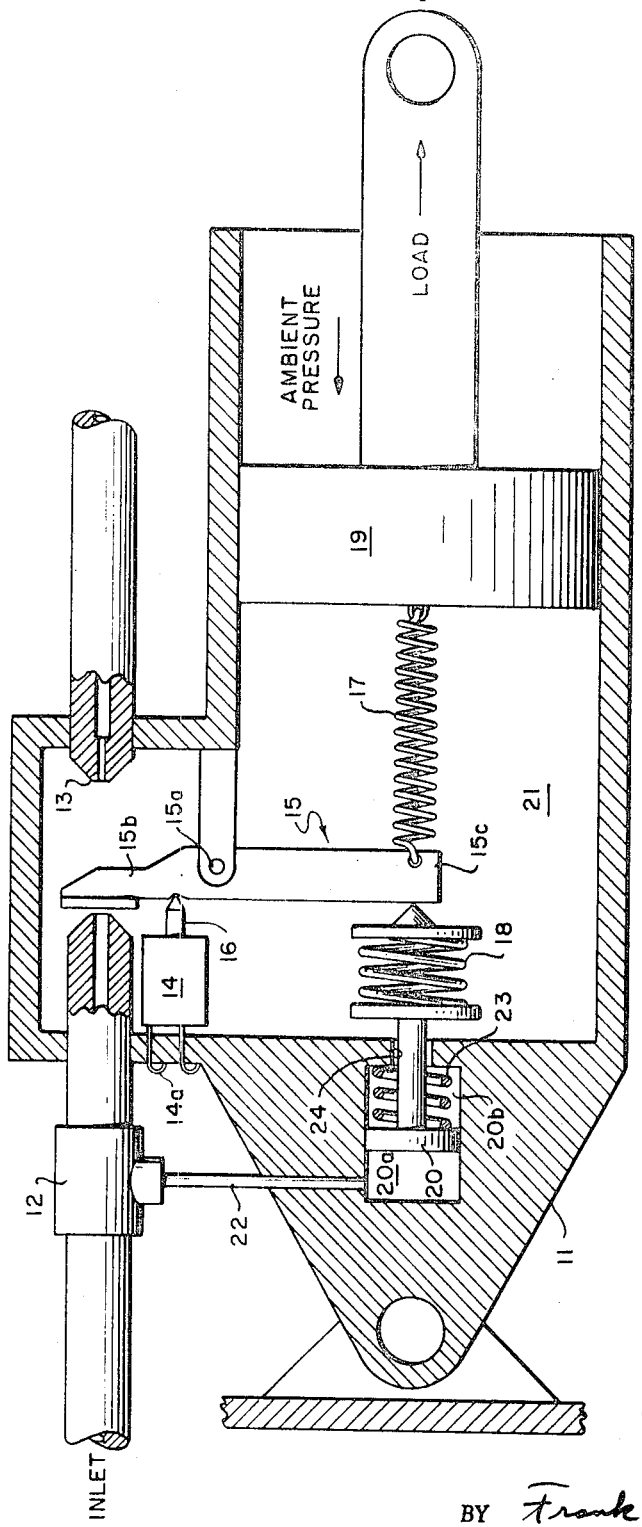

3,468,221
SINGLE STAGE SERVO ACTUATOR
Guy L. Johnson, Annapolis, Md., assignor to the United States of America as represented by the Secretary of the Navy
Filed Sept. 29, 1967, Ser. No. 671,888
Int. Cl. F15b 13/042, 13/16
U.S. Cl. 91—52                                   2 Claims

ABSTRACT OF THE DISCLOSURE

A single stage servo actuator utilizing a single solenoid actuated flapper nozzle valve and a feedback spring adjusted by actuator piston displacement to control hydraulic fluid flow through the actuator.

Background of the invention

The present invention relates to single stage servo actuators and more particularly to load compensation of a single stage servo actuator using seawater for hydraulic fluid.

Heretofore, control arrangements for fluid operated devices have been complicated and expensive to manufacture. Prior art valves are subject to malfunction from contamination present in the control fluid. The problem of malfunction due to contamination in the pilot valve of a two stage electrohydraulic servo valve, having internal feedback, is treated in the prior art by introducing filtering in series with the pilot valve fluid.

Multiple staged servo valves have been used to minimize load effects, however, these valves are impractical when seawater is used as the hydraulic fluid because of the low lubricity and the corrosiveness of seawater. Single stage servo actuators are more effectively adapted for use with seawater hydraulic fluid.

Summary

The general purpose of this invention is to provide a single stage servo actuator valve arrangement which is simple in design and which is dependable. A single servo valve is used to control hydraulic fluid flow through the actuator. The inlet pressure is balanced by the actuator load pressure and an internal feedback system thus maintaining the actuator piston displacement more nearly as a function of an input signal and therefore less load sensitive.

It is, therefore, an object of the invention to provide an improved single stage servo valve.

A further object is to provide a simple means for compensating for variations in servo pressure.

Another object is to provide an improved hydraulic servo valve having internal feedback.

Other objects and many of the attendant advantages of this invention will be readily appreciated as the same becomes better understood by reference to the following detailed description when considered in connection with the accompanying drawing in which like reference numerals designate like parts throughout the figures thereof and wherein:

The single figure is a sectional view of a servo system embodying the invention.

Description of the preferred embodiment

A valve casing 11, has an inlet port 12 communicating with a source of high pressure fluid and an outlet port 13. A force motor 14, secured to the valve casing 11 communicates with a source (not shown) producing an electrical signal, as indicated at 14a. A rotatable control valve member 15 is pivotally connected to the valve casing 11 as indicated at 15a. Control valve member end 15b is subjected to the force exerted by the attached force motor 14 through armature 16 and on the opposite end 15c is subjected on one side to the force exerted by feedback spring 17 and on the other side to the force exerted by null spring 18.

The valve casing 11 also has an actuator piston 19, a load compensator piston 20, its chambers 20a and 20b, and a variable volume chamber 21. The tension of the feedback spring 17 is varied by actuator piston 19 displacement and its function is to balance the force of force motor 14 on the control valve 15. The load compensator piston chamber 20a is connected to the inlet pressure through a passage 22. The inlet pressure causes load compensator piston 20 to act on null spring 18 which reacts on control valve member 15. The inlet pressure on the load compensator piston 20 is balanced by the actuator load pressure in chamber 21 and a load compensator spring 23. Variable volume chamber 21 communicates with chamber 20b through passage 24.

Description of the operation

In the preferred embodiment, this invention may be attached to the underside of a deep submergence vessel.

Inlet pressure is supplied through a pump (not shown). Ambient pressure of the seawater at depths below 300 feet provides the force required for displacing actuator piston 19 inward, to the left as shown in the figure. The ambient pressure, therefore, provides the working or lifting force. Inlet pressure is approximately 125 p.s.i. above ambient pressure.

The single control valve member 15 is used to control hydraulic fluid flow through the actuator. Control valve member 15 displacement is initiated by an electrical signal transmitted to force motor 14. When the fluid pressures in the system are in balance, there is no change in volume of variable volume chamber 21. Actuator piston 19 and the load compensator piston 20 are held stationary. The control valve member 15 is then at a null position with a metering area sufficient to provide a fluid flow equal to the outlet flow.

A decrease in the electrical signal transmitted to force motor 14, will reduce the force acting to displace force motor armature 16 and cause a repositioning of control valve member 15. The movement of control valve member 15 will be proportional to the electrical signal input to force motor 14. The actuator piston 19, affected by a change in fluid pressure drop across its face will become unbalanced and move proportionally to the force acting thereon.

If, for example, a sudden decrease in the load occurs, ambient pressure forces actuator piston 19 inward. Inward movement of actuator piston 19 decreases the volume of variable volume chamber 21, thus momentarily increasing the pressure in variable volume chamber 21. This increased pressure is transmitted through passage 24 to load compensator piston chamber 20b thereby moving load compensator piston 20 to the left as shown in the figure. This movement of compensator piston 20 reduces the force applied to null spring 18 which in turn reduces the force on control valve member 15c. Inward movement of actuator piston 19 also reduces tension in feedback spring 17. With a reduction of the forces tending to keep the control valve member 15 in a closed position, inlet pressure forces control valve member 15 to a more open position. Increased fluid flow into variable volume chamber 21, increases the pressure, thus moving actuator piston 19 outward toward its starting position.

As actuator piston 19 approaches its starting position, as set by force motor 14, tension increases in feedback spring 17, thus exerting a force on control valve member 15c which in turn further blocks inlet port 12. As the pressure differential between inlet port 12 and variable volume chamber 21 decreases, pressure in load compensator piston chamber 20a increases thus forcing load compensator piston 20 to compress null spring 18, load compensator spring 23 and to exert a valve closing force on control valve member 15c. This process continues until a new null position is reached. The load compensator 20 therefore maintains the actuator piston 19 displacement more nearly a function of solenoid force.

It will be apparent from the foregoing discussion that the servo valve and force motor of the present invention greatly enhance the art of servo control mechanisms.

The invention described herein may be manufactured and used by or for the Government of the United States of America for governmental purposes without the payment of any royalties thereon or therefor.

It should be understood, of course, that the foregoing disclosure relates only to the preferred embodiment of the invention and that numerous modifications or alterations may be made therein without departing from the spirit and the scope of the invention.

What is claimed is:

1. A single stage servo actuator system comprising:
 a casing having walls defining a single chamber therein;
 an inlet port located in the wall of said casing for passing fluid under pressure into said chamber;
 an outlet port of predetermined restriction located on the casing wall in series flow relation to said inlet port for passing fluid out of said chamber;
 an actuator piston positioned in a portion of said chamber for reciprocating movement therein, the outer surface of said piston defining an outer wall portion of said casing, said chamber thus being of variable volume;
 an elongated flapper valve element pivotally mounted within said chamber so that the ends of said element rotate oppositely;
 said flapper valve element having one end positioned adjacent said inlet port enabling rotation of the element by the force of the fluid from the inlet port acting on said one end;
 a feedback tension spring positioned within said chamber connecting the other end of said flapper valve element to said actuator piston and acting on said flapper valve element to move said one end toward said inlet port;
 a motor having a reciprocating drive element positioned within the chamber for acting on the said one end of said flapper valve element in a direction to move said element away from said inlet port; and
 load compensator means located in a portion of said chamber adjacent the other end of said flapper valve element, said compensator means comprising a control piston reciprocatable in said chamber portion responsive to both inlet and chamber fluid pressures, a spring biasing said control piston against the inlet fluid pressure and biased linkage means connecting said piston to act against the other end of the flapper valve element in a direction to move the said one end of the element toward said inlet port;
 whereby said load compensator means is responsive to pressure variation in said chamber to reposition said flapper valve element to establish a null pressure in said chamber.

2. A single stage servo actuator system according to claim 1 wherein said biased linkage means comprises a pushplate, a rod connecting said control piston and pushplate, a contact member contacting said other end of said flapper valve element, and a compression spring positioned between said pushplate and said contact member.

References Cited

UNITED STATES PATENTS

| | | | |
|---|---|---|---|
| 2,408,685 | 10/1946 | Rosenberger | 91—386 |
| 2,995,116 | 8/1961 | Dobbins | 91—387 |
| 3,131,601 | 5/1964 | Curran | 91—387 |
| 3,171,329 | 3/1965 | Rasmussen | 91—388 |
| 3,316,815 | 5/1967 | Chapin et al. | 91—386 |

PAUL E. MASLOUSKY, Primary Examiner

U.S. Cl. X.R.

91—359, 387